(12) United States Patent
Hartmann et al.

(10) Patent No.: US 7,099,914 B1
(45) Date of Patent: Aug. 29, 2006

(54) SYSTEM AND METHOD FOR VARIABLE SIZE RETRIEVAL OF WEBPAGE DATA

(75) Inventors: Richard G. Hartmann, Endicott, NY (US); Gilford F. Martino, Endwell, NY (US); Vincent T. Timon, III, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 09/344,323

(22) Filed: Jun. 24, 1999

(51) Int. Cl.
*G06F 15/16* (2006.01)

(52) U.S. Cl. ..................... 709/203; 715/744
(58) Field of Classification Search ............... 709/203, 709/201, 246; 345/744; 715/511; 370/390, 370/392, 462
See application file for complete search history.

(56) References Cited

U.S. PATENT DOCUMENTS

| | | | | |
|---|---|---|---|---|
| 5,572,643 A | | 11/1996 | Judson ........................ 395/793 |
| 5,623,589 A | | 4/1997 | Needham et al. ........... 395/160 |
| 5,675,507 A | | 10/1997 | Bobo, II ................. 364/514 R |
| 5,696,898 A | | 12/1997 | Baker et al. ............ 395/187.01 |
| 5,699,458 A | | 12/1997 | Sprague ....................... 382/250 |
| 5,764,908 A | * | 6/1998 | Shoji et al. .................. 709/203 |
| 5,806,078 A | * | 9/1998 | Hug et al. ................... 715/511 |
| 5,835,911 A | * | 11/1998 | Nakagawa et al. .......... 707/203 |
| 5,844,554 A | * | 12/1998 | Geller et al. ................. 345/744 |
| 5,860,071 A | * | 1/1999 | Ball et al. .................... 707/100 |
| 5,987,504 A | * | 11/1999 | Toga ............................ 709/203 |
| 6,026,433 A | * | 2/2000 | D'Arlach et al. ............. 707/10 |
| 6,026,437 A | * | 2/2000 | Muschett et al. ............ 709/219 |
| 6,041,324 A | * | 3/2000 | Earl et al. ...................... 707/10 |
| 6,085,193 A | * | 7/2000 | Malkin et al. ................. 707/10 |
| 6,112,246 A | * | 8/2000 | Horbal et al. ................ 709/230 |
| 6,167,441 A | * | 12/2000 | Himmel ..................... 707/104.1 |
| 6,185,625 B1 | * | 2/2001 | Tso et al. ..................... 345/748 |
| 6,209,029 B1 | * | 3/2001 | Epstein et al. ............... 709/219 |
| 6,216,141 B1 | * | 4/2001 | Straub et al. ................ 345/744 |
| 6,222,847 B1 | * | 4/2001 | Ball et al. .................... 370/410 |
| 6,223,188 B1 | * | 4/2001 | Albers et al. ............. 707/501.1 |
| 6,226,642 B1 | * | 5/2001 | Beranek et al. ............. 345/738 |
| 6,292,185 B1 | * | 9/2001 | Ko et al. ...................... 345/763 |
| 6,300,947 B1 | * | 10/2001 | Kanevsky .................... 345/804 |
| 6,366,933 B1 | * | 4/2002 | Ball et al. .................... 715/511 |
| 6,401,099 B1 | * | 6/2002 | Koppolu et al. ......... 707/103 R |

OTHER PUBLICATIONS

Berners-Lee et al., "Hypertext Transfer Protocol—HTTP/1.0", Network Working Group, RFC 1945, May 1996.*
Fielding et al., "Hypertext Transfer Protocol—HTTP/1.1", Network Working Group, RFC 2068, Jan. 1997.*
Network Working Group, "Request for Comments (RFC) 1945", *Hypertext Transfer Protocol—HTTP/1.0*, May 1996, Sections 5.1.1, 8.1, 8.2. Web link: http://www.ics.uci.edu/pub//ietf/http/rfc1945.
"Method for Web Browser to Project Download Times and Adjust Behavior Accordingly", *IBM Technical Disclosure Bulletin*, vol. 40, No. 11, Nov. 1997, pp. 125-126.

* cited by examiner

*Primary Examiner*—Thong Vu
*Assistant Examiner*—Hai V. Nguyen
(74) *Attorney, Agent, or Firm*—Shelley M. Beckstrand

(57) ABSTRACT

A user desiring to retrieve any multimedia document (such as image, sound, audio, video, text) is provided the ability to select the size of the document desired. The HTTP protocol HEAD method is used for extracting content length and content type from the server. Whether the client browser requests the document or not is based on the content length and content type sent in the header served to the browser by the server and the minimum or maximum size selected by the user for the relevant type. If the content size is not within the parameters defined by the user, the document will not be requested or served on the network.

20 Claims, 6 Drawing Sheets

SYSTEM AND METHOD FOR VARIABLE SIZE RETRIEVAL OF WEBPAGE DATA

BACKGROUND OF THE INVENTION

1. Technical Field of the Invention

This invention pertains to retrieval of data. More specifically, it relates to variable size retrieval of Webpage images, audio, video and text data.

2. Background Art

It is an attribute of the World Wide Web that users wait. They are, it would seem, constantly waiting for web pages to be retrieved and for images to be loaded, or sound bites to be loaded, video to be loaded and/or large amounts of text to be loaded for display or performance at a user terminal.

Some pages require enormous amounts of data for images, and even more data for audio and video clips. Current web browsers allow the user to prevent the retrieval of video clips and to prevent audio clips. However, there currently is no provision for allowing a user to define by data type the minimum and maximum data sizes that will be communicated over the web by a server in response to a client browser request.

Consequently, there is a need in the art for a system and method whereby users are provided the capability of preventing certain sizes of data from being retrieved. That is, to provide such users the capability to limit the size of text, image, audio and video data from being retrieved. There is, further, a need in the art for a system and method whereby users are provided the capability of limiting data served by a server in response to a browser request to a range within user selected minimum and maximum data size, and to selectively define that minimum and maximum data size by data type.

A HEAD method is defined in the HTTP protocol at level 0.9 and higher by which a HTTP server responds to a browser request by serving to the browser just the header of a data file. The header contains the content-length of the data that would have been served had the complete file been requested using a GET. Currently the HEAD method is being used for testing hypertext links for validity, accessibility, and recent modification. It is also used to filter the cache after data has been retrieved. Typically, applications using the HEAD method will retrieve the data at least once before deciding to either retrieve more data or discard the data.

RFC 1945, which describes the GET and HEAD methods, includes the following. The web link is:

http://www.ics.uci.edu/pub//ietf/http/rfc1945

From RFC 1945, at sections 5.1.1, 8.1 and 8.2:

5.1.1 Method

The Method token indicates the method to be performed on the resource identified by the Request-URI. The method is case-sensitive.

| | | |
|---|---|---|
| Method | = "GET" | ; Section 8.1 |
| | \| "HEAD" | ; Section 8.2 |
| | \| "POST" | ; Section 8.3 |
| | \| extension-method | |
| extension-method = token | | |

"The list of methods acceptable by a specific resource can change dynamically; the client is notified through the return code of the response if a method is not allowed on a resource. Servers should return the status code 501 (not implemented) if the method is unrecognized or not implemented."

"The methods commonly used by HTTP/1.0 applications are fully defined in Section 8 . . . "

8.1 GET

"The GET method means retrieve whatever information (in the form of an entity) is identified by the Request-URI. If the Request-URI refers to a data-producing process, it is the produced data which shall be returned as the entity in the response and not the source text of the process, unless that text happens to be the output of the process."

"The semantics of the GET method changes to a "conditional GET" if the request message includes an If-Modified-Since header field. A conditional GET method requests that the identified resource be transferred only if it has been modified since the date given by the If-Modified-Since header, as described in Section 10.9. The conditional GET method is intended to reduce network usage by allowing cached entities to be refreshed without requiring multiple requests or transferring unnecessary data."

8.2 HEAD

"The HEAD method is identical to GET except that the server must not return any Entity-Body in the response. The metainformation contained in the HTTP headers in response to a HEAD request should be identical to the information sent in response to a GET request. This method can be used for obtaining metainformation about the resource identified by the Request-URI without transferring the Entity-Body itself. This method is often used for testing hypertext links for validity, accessibility, and recent modification."

"There is no "conditional HEAD" request analogous to the conditional GET. If an If-Modified-Since header field is included with a HEAD request, it should be ignored."

It is an object of the invention to provide an improved system and method for allowing a user to define the type and size of data to be served in response to a client browser request.

It is a further object of the invention to provide an improved system and method for preventing transfer over the web of data files larger than those which a user is willing to accept.

It is a further object of the invention to provide an improved system and method for reducing the wait time perceived by a user when requesting data from a server.

It is a further object of the invention to provide an improved system and method utilizing the HEAD method for allowing a user to define the type and size of data to be served in response to a client browser request.

It is a further object of the invention to provide a system and method utilizing the HEAD method for allowing a user to determine whether to retrieve data from a server before retrieving any data other than the header.

It is a further object of the invention to provide a system and method allowing a user to prevent smaller content web pages from being returned.

SUMMARY OF THE INVENTION

In accordance with a first embodiment of the invention a server system and method is responsive to a request for data from a client browser. The server receives from the client a HEAD request for the header of a data file or document.

Responsive to the HEAD request, the server serves to the browser data file header information including data type and data size. Thereafter, upon receiving from the browser a GET request, the server serves to the browser the data file or document corresponding to the header.

In accordance with a second embodiment of the invention, a browser system and method requests a data file or document from a server. The browser receives data parameters from a browser user, and thereafter communicates a HEAD request to the server. Subsequently, the browser receives from the server in response to the HEAD request a data file header describing data file parameters. The browser then determines if the data file parameters are within the user data parameters and, if so, communicates to the server a GET request requesting that the server serve data file or document.

In accordance with an aspect of the invention, there is provided a computer program product configured to be operable to cause a browser to request a data file or document from a server. The browser is configured to receive data parameters from a browser user, and thereafter communicate a HEAD request to the server. Subsequently, the browser is configured to receive from the server in response to the HEAD request a data file header describing data file parameters. The browser is then configured to determine if the data file parameters are within the user data parameters and, if so, communicate to the server a GET request requesting that the server serve data file or document.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, a computer user is provided the capability of selectively choosing the size and type of audio, video, image, application MIME type data that will be served in response to a user request.

In accordance with the preferred embodiment of the invention, a user desiring to retrieve any multimedia document (such as image, sound, audio, video, text) is provided the ability to select the size of the document desired. The HTTP protocol HEAD method is used for extracting content length and content type from the server. Whether the client browser requests the document or not is based on the content length and content type sent in the header served to the browser by the server and the minimum or maximum size selected by the user for the relevant type. If the content size is not within the parameters defined by the user, the document will not be requested or served on the network.

Figure 1:
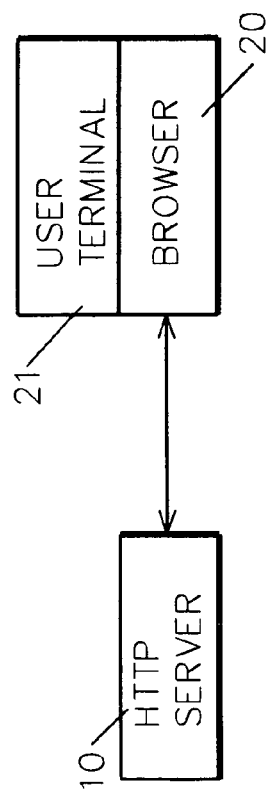
FIG. 1 is a high level system diagram of a typical client/server system.

Referring to FIG. 1, user terminal 21 with web browser 20 and HTTP server 10 are illustrated.

Figure 2:
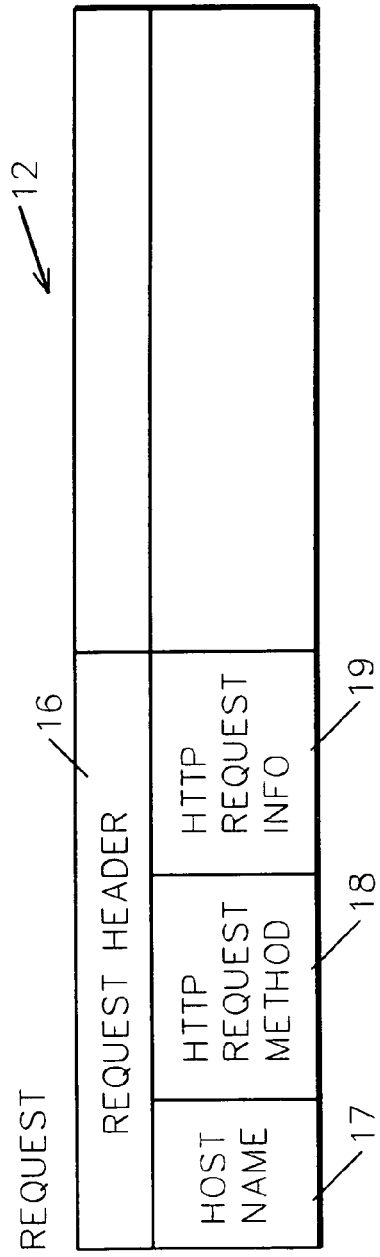
FIG. 2 is an illustration of a request message.

Referring to FIG. 2, a typical WEB browser 20 issues a request 12 using a URL. Browser 20 uses the URL to generate an HTTP request header 16 containing, among other things, hostname 17 for server 10, HTTP request method 18 and request information 19.

Figure 3:
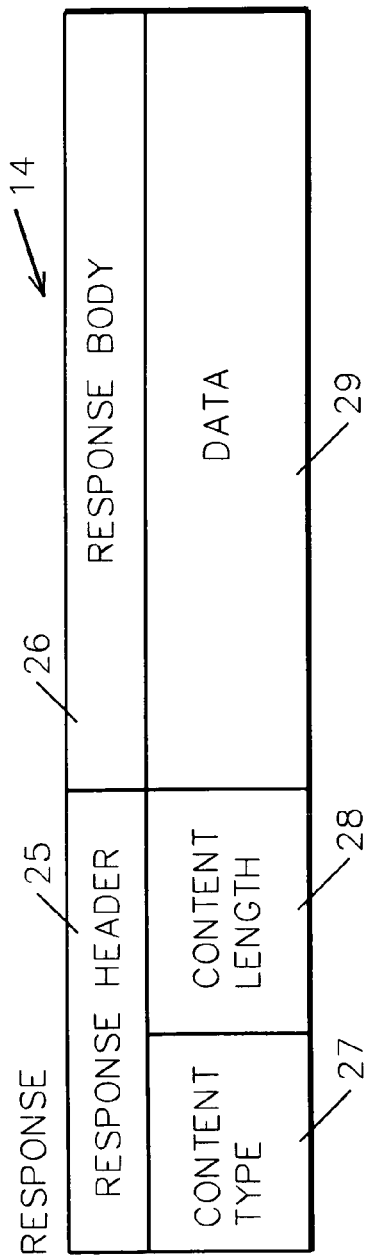
FIG. 3 is an illustration of a response message.

Referring to FIG. 3, HTTP request 12 is processed by an HTTP server 10 to generate an HTTP response header 25 and response body 26. Response header 25 includes the content type 27 and content length 28 of the data 29 that is served in the response body 26. When the request method 18 is GET, both response header 25 and body 26 are served in response 14. When method 18 is HEAD, only response header 25 is served. The content length 28 in the response header 25 for a HEAD request 12 is the length of the data 29 that would have been served had the request method 18 of request 12 been a GET.

Figure 4:
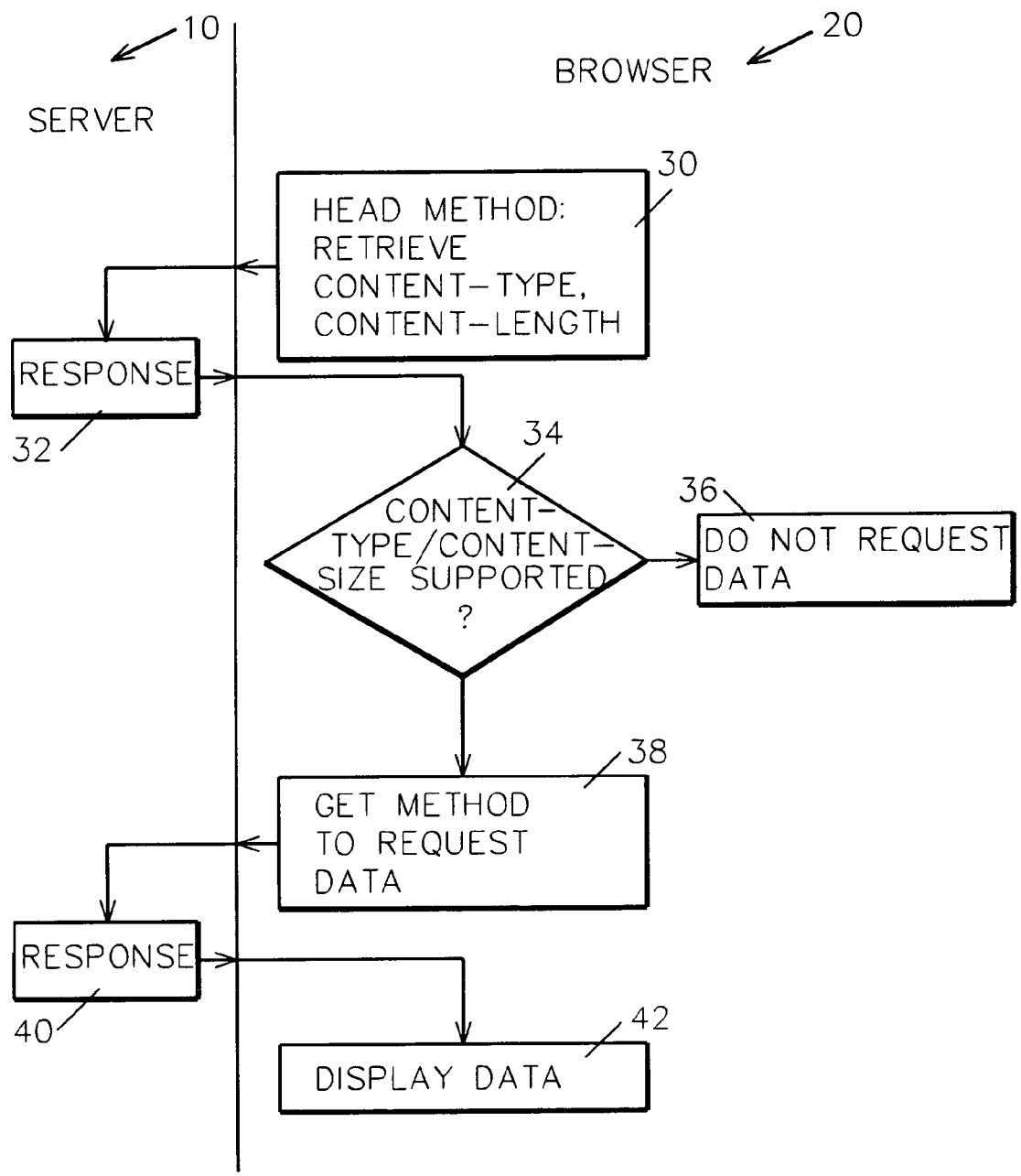
FIG. 4 is a flow diagram illustrating the method of a first embodiment of the invention.

Referring to FIG. 4, a flow diagram of the preferred embodiment of the invention is illustrated. In step 30, browser 20 issues a HEAD request message to server 10, which responds in step 32 with a header 25 giving content type 27 and content length 28 of data 29, but not data 29 itself.

In step 34, browser 20 determines from response 25 if the content type 27 and content length 28 are within parameters established by the user. If not, as is illustrated by step 36, the corresponding data 29 is not requested (that is, a GET will not be issued). However, if the content type and size are supported, then in step 38 a GET request message 12 is sent to the server, which responds with the full response message 14, including both header 25 and body 26, including data 29, which data 29 in step 42 is displayed by the browser to the user.

In accordance with the invention, the HEAD method is used to retrieve from a server the size and type of data which will be served to the browser IF the browser determines that that data is within user established parameters. If it is not, then the data is not requested by the browser and, consequently, not served. In this manner, the user is not forced to wait or cancel a transmission of data of type or size in excess of what the user is willing to receive. If a HEAD request determines that the corresponding data is not within acceptable parameters, the browser may abort the request outright or advise the user (by way of a display panel not shown) of type/size of data requested, giving the user the opportunity to change the acceptance parameters if desired.

Figure 5:
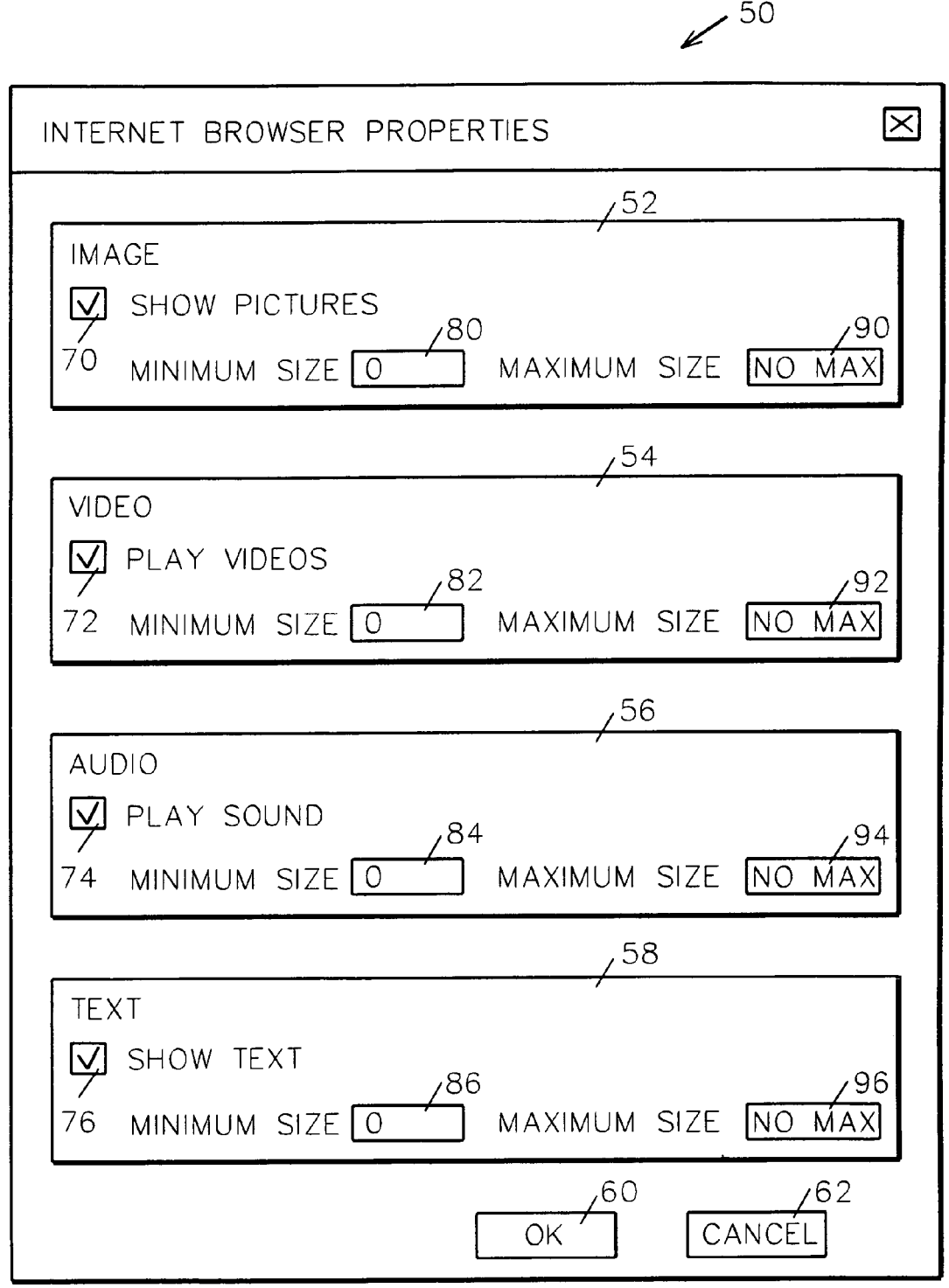
FIGS. 5–7 are illustrations of Internet browser properties panels.

Referring to FIG. 5, an example of a browser properties panel 50 is illustrated for use by the user at terminal 21 in establishing parameters for accepting data. As illustrated, panel 50 includes panels 52–58 corresponding respectively to image, video, audio and text data. The user selects fields 70, 72, 74, and 76 to indicate the type of data which will be accepted for showing or playing at terminal 21, and in fields 80, 82, 84 and 86 the minimum size in kilobytes and in fields 90, 92, 94 and 96, respectively, the maximum size in kilobytes of data which will be accepted. In the example of FIG. 5, the user accepts each data type without limitation. Buttons 60 and 62 are selected by the user to accept or cancel, respectively, the settings in fields 70–76, 80–86 and 90–96.

Figure 6:
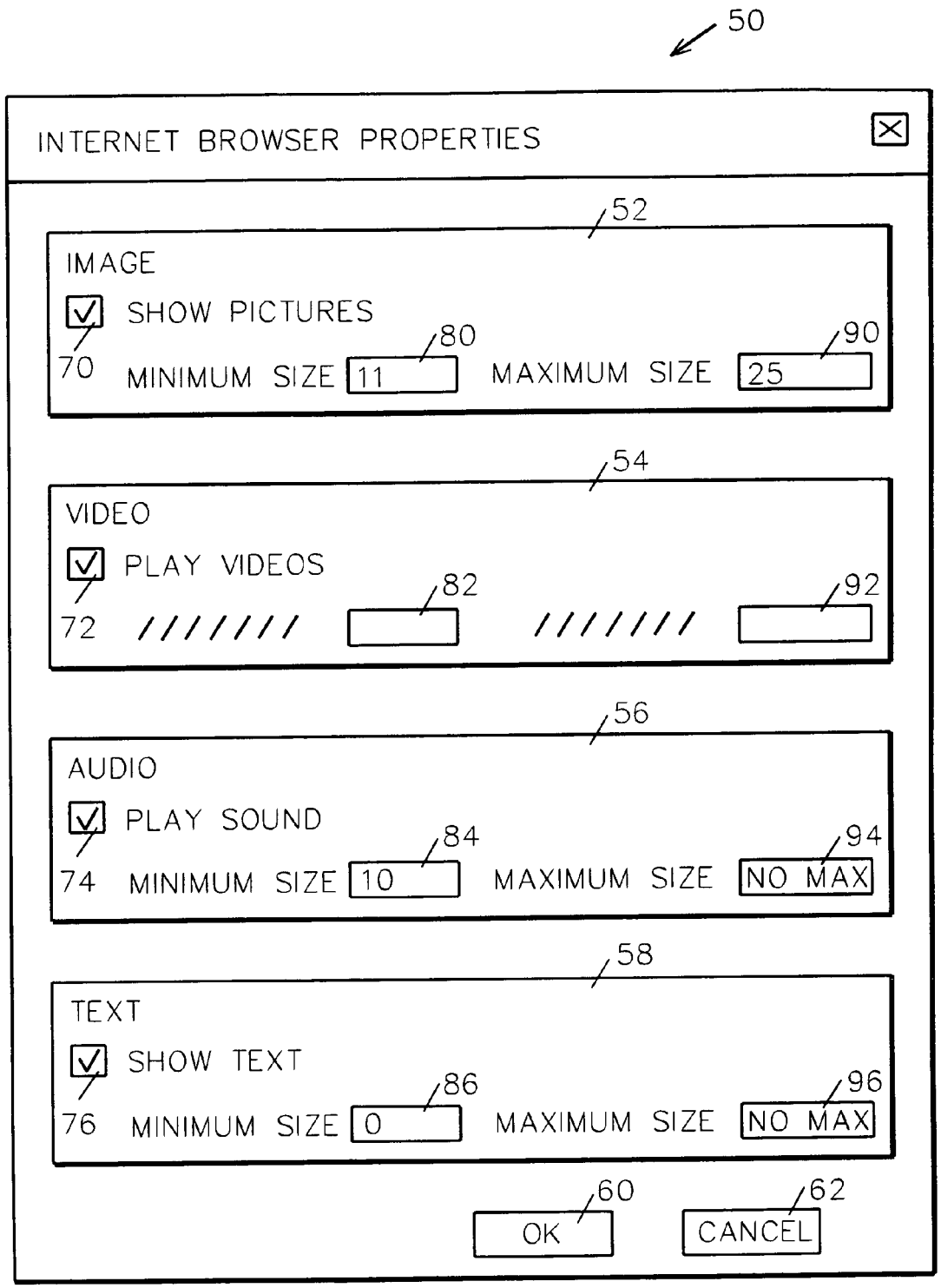

Referring to FIG. 6, the user has selected buttons 70, 74 and 76 to show pictures, play sound and show text, respectively. By not selecting button 72, the user indicates that videos will not be selected and, consequently, fields 82 and 92 are greyed out. Image data between 11,000 and 25,000 bytes will be shown, sound data of at least 10,000 bytes will be played, and text of any size will be shown.

Figure 7:
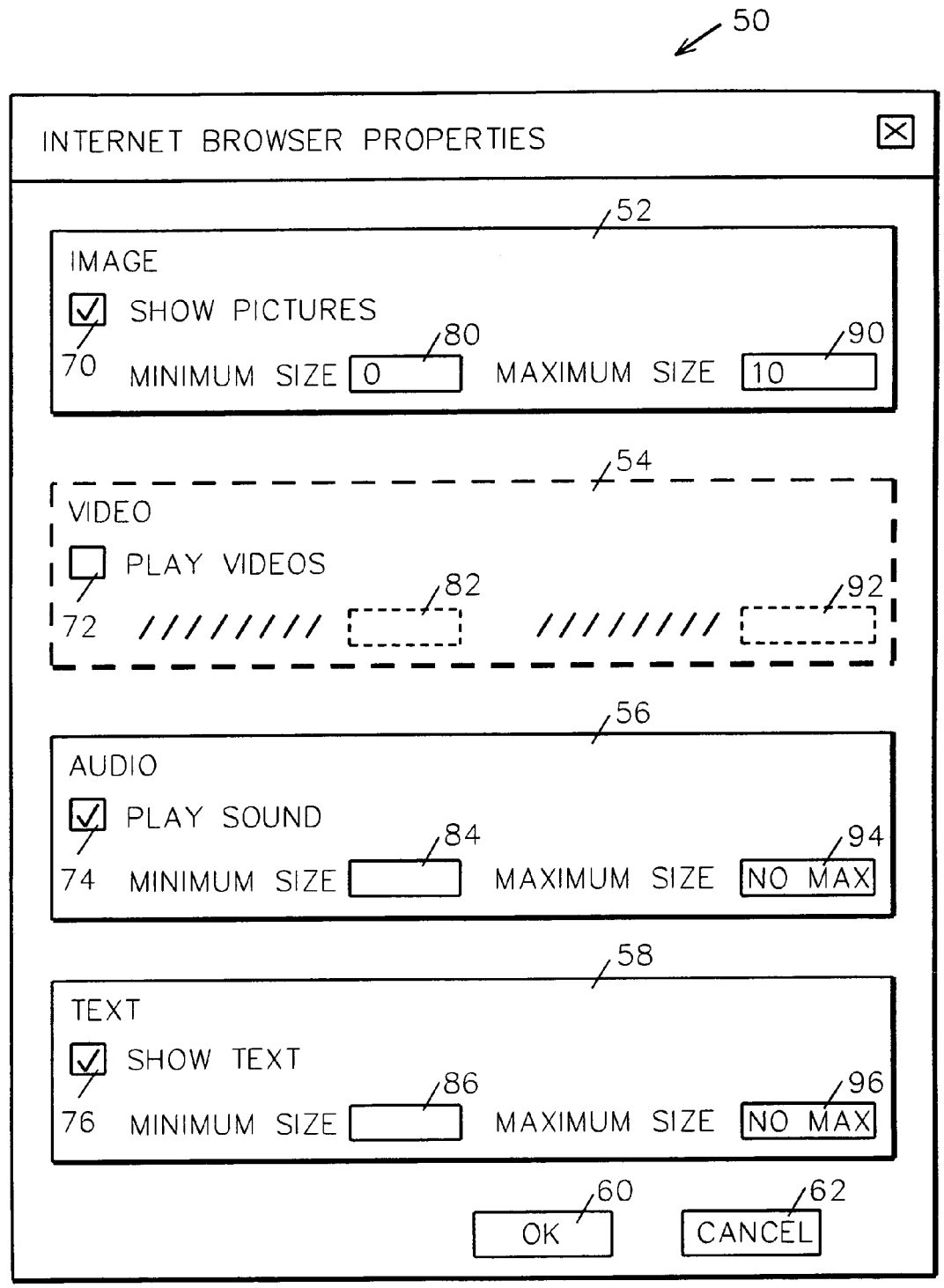

Referring to FIG. 7, the user has indicated that image data not exceeding 10,000 bytes is to be shown, audio data of any size is to be played, and text data of any size is to be shown.

Figure 8:
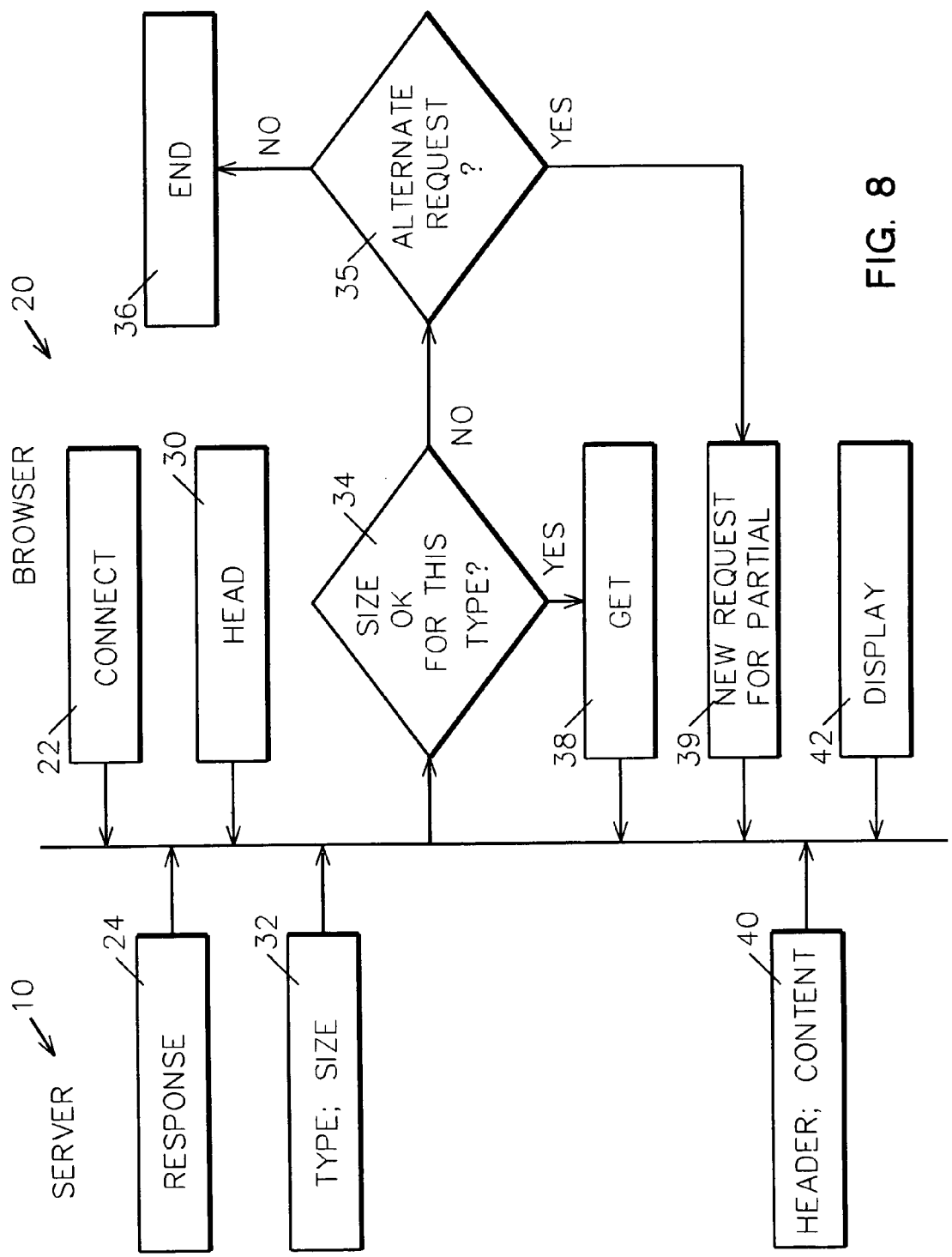
FIG. 8 is a flow diagram illustrating the method of a second embodiment of the invention.

Referring to FIG. 8, an alternative embodiment of the method of the invention is illustrated. In this embodiment, steps 22 and 24 are illustrated for establishing a connection between browser 20 and server 10, and steps 35 and 39 added for enabling an alternative response to a determination in step 34 that the response to a HEAD request is a message identifying a data type or data size outside of the parameters accepted by the user. In step 35, browser 35 determines if an alternative request may be issued and, if so, in step 39 a new request message is set for a partial set of data. That partial set of data may be, for example, the first n bytes of data. These data bytes may be displayed to the user and may be helpful to the user in determining whether to change the acceptance parameters (such as maximum size).

Referring to Table 1, the GET method is illustrated. When content type 27 is text or html, client browser 20 sends a request 12 for each inline data element in the html document. Table 1 illustrates a request 12 for a document that contains four inline documents. There are five requests 12 initiated by the client browser 20. The GET method is used for each request 12 that sends all the data in the response (URL: http://hostname). This URL generates five requests 12: one for the initial document ("GET/HTTP/1.0") and a separate request 12 for each included inline document.

TABLE 1

| GET METHOD |
| --- |
| GET/HTTP/1.0 |
| GET/image/picture1.gif HTTP/1.0 |
| GET/image/picture2.gif HTTP/1.0 |
| GET/image/picture3.gif HTTP/1.0 |
| GET/image/picture4.gif HTTP/1.0 |

Referring to Table 2, the HTTP/1.0 protocol request and response messages 12 and 14, respectively, using GET and HEAD methods 18 is shown. The example shown in Table 2 uses the predefined browser settings illustrated in FIG. 7, which allow object types of text of any size, audio of any size, pictures having a size within range from 0 bytes to 10,000 bytes, and block all video documents. FIGS. 5 and 6 illustrate no restrictions on data type, and variable sizes on pictures and sounds. The flow diagram of FIG. 4 illustrates the processing of each document and/or inline document as it is requested by client browser 20 using the HEAD method.

TABLE 2

| HEAD METHOD | |
| --- | --- |
| BROWSER REQUEST/ ACTION | SERVER RESPONSE |
| STEP 1) | |
| HEAD/HTTP/1.0 | RETURNS RESPONSE HEADER WITH INITIAL DOCUMENT TYPE AND SIZE: Content type: text/html Content length: 3450 |
| STEP 2) | |
| GET/HTTP/1.0 | RETURNS RESPONSE HEADER AND RESPONSE BODY |

TABLE 2-continued

| HEAD METHOD | |
| --- | --- |
| BROWSER REQUEST/ ACTION | SERVER RESPONSE |
| STEP 3) | |
| HEAD/image/picture1.gif HTTP/1.0 | RETURNS FIRST INTERNAL OBJECT TYPE AND SIZE: Content type: image/gif Content length: 4118 |
| STEP 4) | |
| HEAD/image/picture2.gif HTTP/1.0 | RETURNS FIRST INTERNAL OBJECT TYPE AND SIZE: Content type: image/gif Content length: 961 |
| STEP 5) | |
| HEAD/image/picture3.gif HTTP/1.0 | RETURNS FIRST INTERNAL OBJECT TYPE AND SIZE: Content type: image/gif Content length: 57419 |
| STEP 6) | |
| HEAD/image/picture4.gif HTTP/1.0 | RETURNS FIRST INTERNAL OBJECT TYPE AND SIZE: Content type: image/gif Content length: 1511 |
| STEP 7) | |
| GET/image/picture1.gif HTTP/1.0 | RETURNS IMAGE DATA |
| STEP 8) | |
| GET/image/picture2.gif HTTP/1.0 | RETURNS IMAGE DATA |
| STEP 9) | |
| GET/image/picture4.gif HTTP/1.0 | RETURNS IMAGE DATA |

Referring further to the example of Table 2, in step 1 browser 20 issues a HEAD request to determine initial document type and size.

In step 2, the GET request is performed because the corresponding HEAD request of step 1 determined that this document has a type and size within the browser settings (FIG. 7). Browser 20 determines, from the data 29 returned in response message 14, that there are four inline documents. These four inline documents are identified in dat 29 as image/picture1.gif, image/picture2.gif, image/picture3.gif, and image/picture 4.gif. Browser 20 thus determines that it must issue four HEAD requests, one for each of the inline documents. These HEAD requests are issued in steps 3, 4, 5 and 6 and corresponding response messages received and evaluated to determine data type and size.

In step 7, browser 20 issues a GET request for picture1 because the corresponding HEAD request of step 3 determined that this object is a picture that is within the minimum and maximum range defined by the user (FIG. 7). That is, user accepts pictures less than 10,000 bytes. This image is displayed.

In step 8, browser 20 issues a GET request for picture2 because the corresponding HEAD request of step 4 determined that this object is a picture that is within the minimum and maximum range defined by the user. That is, user accepts pictures less than 10,000 bytes, and this object is a picture of length 961 bytes. This image is also displayed.

Browser 20 does not do a GET for picture3 because the corresponding HEAD request of step 5 returned a type and size of object that is outside the bounds of the user predefined browser settings. That is, images of size greater that 10,000 bytes are not accepted, and this object picture3 is an image of size 57,419 bytes.

In step 9, browser 20 issues a GET request for picture4 because the corresponding HEAD request of step 6 determined that his object is a picture that is within the minimum and maximum range defined by the user. That is, user accepts pictures less than 10,000 bytes, and this object is a picture of length 1511 bytes. This image is displayed.

By providing a minimum size of data for a browser a user can prevent smaller content web pages from being returned. This type of information retrieval may be used in preventing the retrieval of web pages under construction.

By providing a minimum and maximum range for a browser a user can allow specific size retrievals. An example of this type of retrieval is for conference papers which have a minimum size and a maximum size associated with them, so that searching for a range for these types of papers would be beneficial. Another example is to prevent retrieval of pictures that are thumbnail size, and retrieving only the larger size pictures, or vice versa, retrieving only large pictures and not the thumbnail size pictures. And yet another example is to allow retrieval of specific types of data—that is, if a user is attempting to fill a ten second spot of a presentation with a sound byte (a ten second audio feed), he could do a search on audio pages within the range of bytes which yield about ten seconds of audio.

ADVANTAGES OVER THE PRIOR ART

It is an advantage of the invention that there provided an improved system and method for allowing a user to define the type and size of data to be served in response to a client browser request.

It is a further advantage of the invention that there is provided an improved system and method for preventing transfer over the web of data files larger than those which a user is willing to accept.

It is a further advantage of the invention that there is provided an improved system and method for reducing the wait time perceived by a user when requesting data from a server.

It is a further advantage of the invention that there is provided an improved system and method utilizing the HEAD method for allowing a user to define the type and size of data to be served in response to a client browser request.

It is a further advantage of the invention that there is provided an improved system and method utilizing the HEAD method for allowing a user to determine whether to retrieve data from a server before retrieving any data other than the header.

It is a further advantage of the invention that there is provided a system and method allowing a user to prevent smaller content web pages from being returned.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for operating a server responsive to a request for data from a user of a client browser specifying predefined configuration parameters comprising one or both of data type and size, comprising the steps of:
   receiving from said browser a head request for the header of a data file;
   responsive to said head request, serving to said browser data file header information including data file data type and size;
   responsive to said browser determining from said data file header that said data file data type and size are in accordance with said request for data, receiving from said browser a get request, said browser responsive to said predefined configuration parameters, consisting only of one or both of said data file data type and said size, not being in accordance with said data file header information, not issuing said get request to said server; and thereafter
   responsive to said get request, serving to said browser data corresponding to said header.

2. A method for operating a client browser for requesting a data file from a server, comprising the steps of:
   receiving data parameters consisting only of one or both of data type and size from a browser user to establish predefined configuration parameters; and thereafter,
   communicating to said server a head request;
   receiving from said server in response to said head request a data file header describing data file parameters including data type and size;
   determining if said data file parameters are within said predefined configuration parameters; and only if so,
   communicating to said server a get request requesting said server to serve said data file.

3. The method of claim 2, wherein said predefined configuration parameters define the data type and data size acceptable to said user and wherein said data file parameters include the data content type and data content size of said data file.

4. The method of claim 3, wherein said data file comprises a plurality of data files including one or more inline documents.

5. The method of claim 4 wherein each of said plurality of data files is of a type selected from the set of data file types including image data, video data, audio data, and text data.

6. The method of claim 5, wherein a head request is submitted separately for each said inline document.

7. The method of claim 6, wherein said get request is submitted selectively only for those inline documents having data parameters within said predefined configuration parameters.

8. The method of claim 3, wherein said predefined configuration parameters include a maximum data size and a minimum data size acceptable to said user.

9. The method of claim 2, responsive to said data file parameters not being within said predefined configuration parameters, comprising the further step of providing to said user the option of modifying said user data parameters.

10. The method of claim 2, responsive to said data file parameters not being within said predefined configuration parameters, comprising the further step of providing to said user the option of requesting a portion of said data file.

11. A server computer system, comprising:
a first logic element of said computer system for receiving from a client browser a head request for a header only of a data document;
a second logic element of said computer system responsive to said head request for serving to said client browser a data document header including data type indicia and data size indicia;
a third logic element of said computer system for receiving from said browser a get request responsive to said browser determining that said data type indicia and data size indicia match predefined configuration parameters consisting only of one or both of data file data type and data filed size from a user request, said browser blocking said get request in the event that said data type indicia and said data size indicia do not match said predefined configuration parameters; and
a fourth logic element of said computer system responsive to said get request for serving to said browser a data document corresponding to said header.

12. A server system including a digital computer, said digital computer comprising:
first means for receiving from a client browser a head request for a header of a data document;
second means responsive to said head request for serving to said client browser a data document header including data type indicia and data size indicia;
third means for receiving from said browser a get request responsive to said browser determining that said data type indicia and data size indicia match predefined configuration parameters consisting only of one or both of data type and data size specified in a user request, said browser blocking said get request in the event that said data type indicia and said data size indicia do not match said predefined configuration parameters; and
fourth means responsive to said get request for serving to said browser a data document corresponding to said header.

13. A client browser including a digital processor for requesting a data file from a server, said digital processor comprising:
means for receiving user specified data parameters consisting only of one or both of data type and size from a browser user to establish predefined configuration parameters;
means for communicating to said server a head request;
means for receiving from said server in response to said head request a data file header describing data file parameters including data type and size;
means for determining if said data file parameters are within said predefined configuration parameters; and only if so,
means operable for communicating to said server a get request requesting said server to serve said data file.

14. A program storage device readable by a machine, tangibly embodying a program of instructions executable by a machine to perform method steps for operating a client browser for requesting a data file from a server, said method steps comprising:
receiving user data parameters consisting only of one or both of data size and type from a browser user to establish predefined configuration parameters; and thereafter
communicating to said server a head request;
receiving from said server in response to said head request a data file header describing data file parameters including data size and type;
determining if said data file parameters are within said predefined configuration parameters; and only if so,
communicating to said server a get request requesting said server to serve said data file.

15. An article of manufacture comprising:
a computer useable medium having computer readable program code means embodied therein for operating a client browser for requesting a data file from a server, the computer readable program means in said article of manufacture comprising:
computer readable program code means for causing a computer to effect receiving user specified data parameters consisting only of one or both of data type and data size from a browser user to establish predefined configuration parameters;
computer readable program code means for causing a computer to effect communicating to said server a head request;
computer readable program code means for causing a computer to effect receiving from said server in response to said head request a data file header describing data file parameters;
computer readable program code means for causing a computer to effect determining if said data file parameters are within said predefined configuration parameters; and only if so,
computer readable program code means for causing a computer to effect communicating to said server a get request requesting said server to serve said data file.

16. A digital computer program element digitally stored in a computer storage medium for operating a client browser for requesting a data file from a server according to the steps of:
receiving data parameters consisting only of one or both of data type and size from a browser user to establish predefined configuration parameters; and thereafter
communicating to said server a head request;
receiving from said server in response to said head request a data file header describing data file parameters including data type and size;
determining if said data file parameters are within said predefined configuration parameters; and only if so,
communicating to said server a get request requesting said server to serve said data file.

17. A program storage device readable by a machine, tangibly embodying a program of instructions executable by a machine to perform method steps for operating a server responsive to a request for data from a client browser, said method steps comprising:
receiving from said browser a head request for the header of a data file;
responsive to said head request, serving to said browser data file header information including data type and data size;

receiving from said browser a get request responsive to said browser determining that said data file is of a data type and data size specified by a user prior to said browser issuing said head request, said browser blocking said get request in the event that said data type indicia and said data size indicia do not match pre-defined configuration parameters consisting only of one or both of said data type and data size specified by said user request; and thereafter responsive to said get request, serving to said browser data corresponding to said header.

18. The program storage device of claim 17, said method steps further comprising responsive to said browser blocking said get request of providing to said user the option of modifying said data type and data size.

19. The program storage device of claim 17, said method steps further comprising responsive to said browser blocking said get request of providing to said user the option of requesting a portion of said data file.

20. The program storage device of claim 17, said method steps further comprising:

receiving from said browser data parameters defining the data type and data size acceptable to said user, wherein said data file parameters include the data content type and data content size of said data file, and wherein said data file comprises a plurality of data files including one or more in-line documents.

* * * * *